(12) United States Patent
Marupaduga et al.

(10) Patent No.: US 9,654,231 B1
(45) Date of Patent: May 16, 2017

(54) DYNAMICALLY MITIGATING EXTERNAL INTERFERENCE IN MULTI-BAND ANTENNA SYSTEMS

(71) Applicant: Sprint Communications Company L.P., Overland Park, KS (US)

(72) Inventors: Sreekar Marupaduga, Overland Park, KS (US); Andrew M. Wurtenberger, Olathe, KS (US); Patrick J. Schmidt, Basehor, KS (US); Matthew J. Masters, Greenfield, IN (US)

(73) Assignee: Sprint Communications Company L.P., Overland Park, KS (US)

( * ) Notice: Subject to any disclaimer, the term of this patent is extended or adjusted under 35 U.S.C. 154(b) by 41 days.

(21) Appl. No.: 14/872,845

(22) Filed: Oct. 1, 2015

(51) Int. Cl.
*H04B 15/00* (2006.01)
*H04W 28/04* (2009.01)
*H04B 17/345* (2015.01)

(52) U.S. Cl.
CPC ......... *H04B 15/005* (2013.01); *H04B 17/345* (2015.01); *H04W 28/048* (2013.01)

(58) Field of Classification Search
CPC .................... H04B 15/005; H04B 17/345
See application file for complete search history.

(56) References Cited

U.S. PATENT DOCUMENTS

2010/0201590 A1* 8/2010 Girard .................... H01Q 1/246
343/766

* cited by examiner

*Primary Examiner* — Christopher M Brandt

(57) ABSTRACT

A device, method, and computer-readable medium are provided for mitigating signal interference at a base station. Signal interference can be generated from subcomponent levels at a base station (e.g., electronic antenna motors) due to non-optimal designs or electric ground interferences. Generally, when power is provided to such subcomponent(s), a noise or harmonic can be inadvertently generated, falling into one of the operating bands of the base station, and negatively impacting system performance. As such, embodiments can be configured to dynamically ascertain a noise baseline associated with the base station, determine that one or more of the subcomponents are at fault for interfering with the base station operating band(s), and mitigate the interfering signal for a period that least impacts system performance.

20 Claims, 4 Drawing Sheets

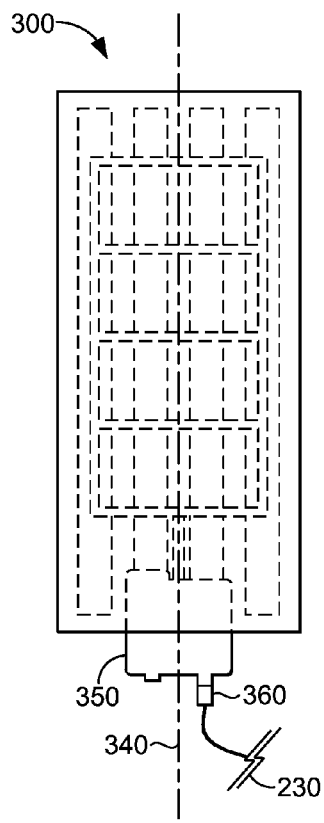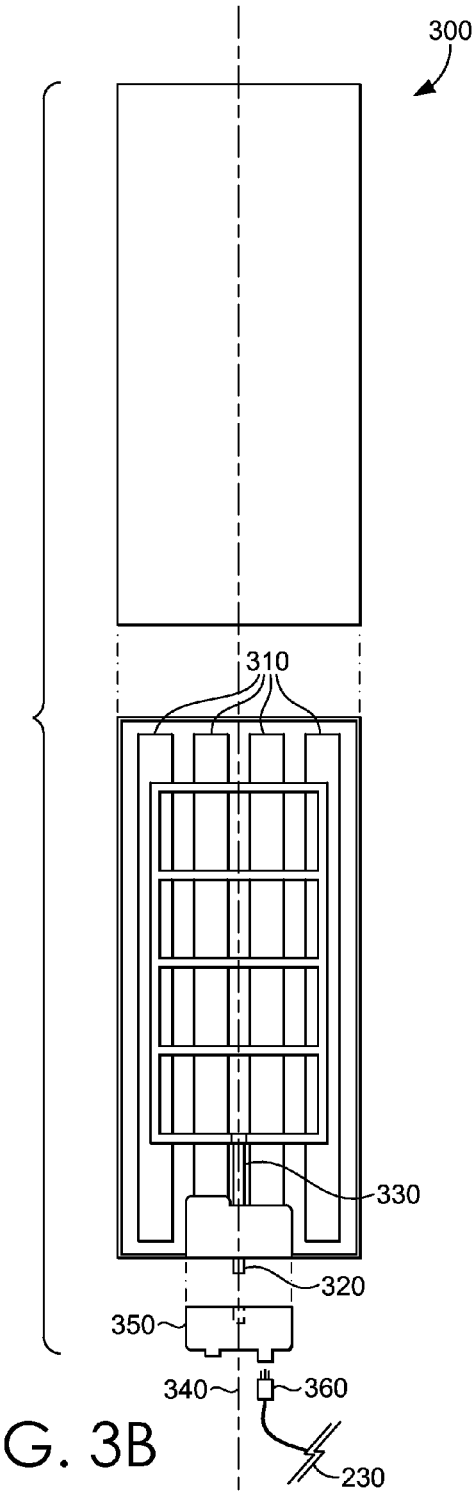
FIG. 3A
FIG. 3B

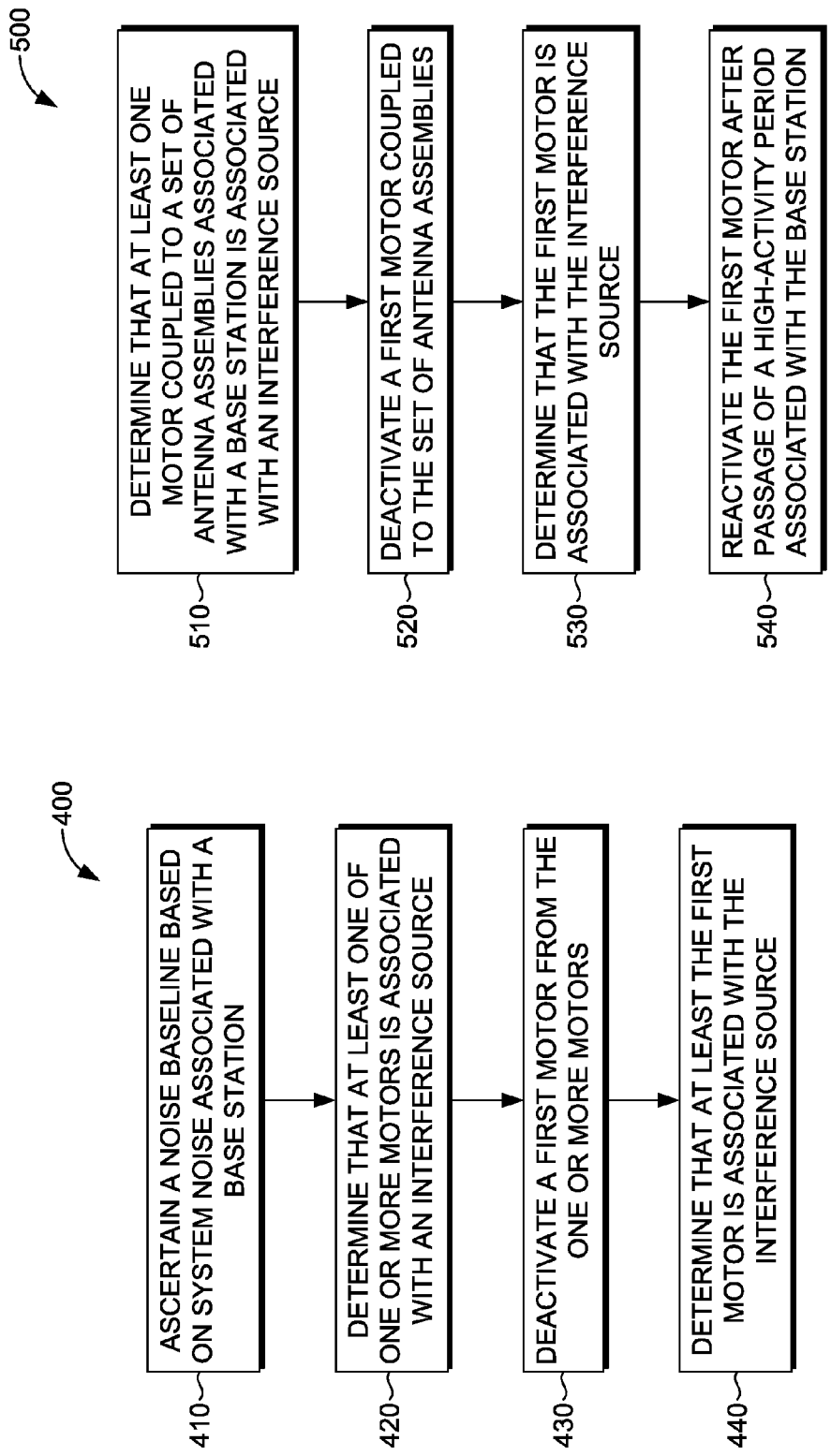

DYNAMICALLY MITIGATING EXTERNAL INTERFERENCE IN MULTI-BAND ANTENNA SYSTEMS

SUMMARY

A high-level overview of various aspects of the invention are provided here for that reason, to provide an overview of the disclosure and to introduce a selection of concepts that are further described below in the detailed-description section below. This summary is not intended to identify key features or essential features of the claimed subject matter, nor is it intended to be used as an aid in isolation to determine the scope of the claimed subject matter.

In brief and at a high level, this disclosure describes, among other things, ways to identify a signal interference source on a base station, and to mitigate the signal interference originating therefrom. For instance, a base station may be configured to operate and/or manage one or more antenna assemblies associated therewith. The base station can be configured to operate electrical motors coupled to various elements of the one or more antenna assemblies, for adjusting tilt, azimuth, and other signal-adjusting movements of the antenna elements, as will be described in more detail herein. In general, the electrical motors are individually powered by a power source. These power sources can, oftentimes due to non-optimal motor or controller design, inadvertently generate a harmonic signal that interferes with one of the operating bands associated with the base station. As such, to mitigate the interference originating therefrom, the source of the interference must be identified and managed accordingly.

In some embodiments described herein, a noise baseline for a base station is ascertained based on system noise associated with the base station. The base station can include a set of one or more antenna assemblies, wherein at least one of the antenna assemblies can have one or more motors coupled thereto. The noise baseline is ascertained while all motors are deactivated. After the noise baseline is ascertained, the motors are reactivated to determine whether at least one of the motors is associated with an interference source. A determination is made that at least one of the motors is associated with an interference source by detecting, upon reactivation of the motors, a threshold variation in the system noise associated with the base station from the noise baseline. If it is determined that at least one of the motors is associated with an interference source, each of the motors can be individually tested to determine if it is associated with the interfering source. While continuing to monitor the system noise associated with the antenna assembly, each motor can be sequentially deactivated to determine, based on the state of the motor, whether the system noise makes a substantial return to the noise baseline.

In other embodiments described herein, a determination can be made that one or more motors coupled to a set of antenna assemblies associated with the base station is associated with an interference source by detecting, in system noise associated with the base station while each of the one or more motors coupled thereto is activated, at least a threshold variation from the noise baseline. A first interference source is then identified by deactivating a first motor in the one or more motors and detecting a substantial return to the noise baseline in the system noise. The first motor is then deactivated for a duration defined by a high-activity period associated with the antenna assembly. If one or more antenna assemblies associated with the first motor needs to be adjusted, the first motor is reactivated and adjusted during a low-activity period associated with the base station.

BRIEF DESCRIPTION OF THE SEVERAL VIEWS OF THE DRAWINGS

Illustrative embodiments of the present disclosure are described in detail below with reference to the attached drawing figures, and wherein:

FIG. 3A is a side perspective view of an antenna assembly in an assembled state in accordance with an embodiment of the present disclosure;

FIG. 3B is an exploded side perspective view of the antenna assembly of FIG. 3A, particularly illustrating an interior of the antenna assembly in accordance with an embodiment of the present disclosure;

FIG. 4 provides an exemplary method for mitigating signal interference at a base station, in accordance with embodiments of the present disclosure; and FIG. 5 provides an exemplary method for mitigating signal interference at a base station, in accordance with embodiments of the present disclosure.

DETAILED DESCRIPTION

Figure 1:
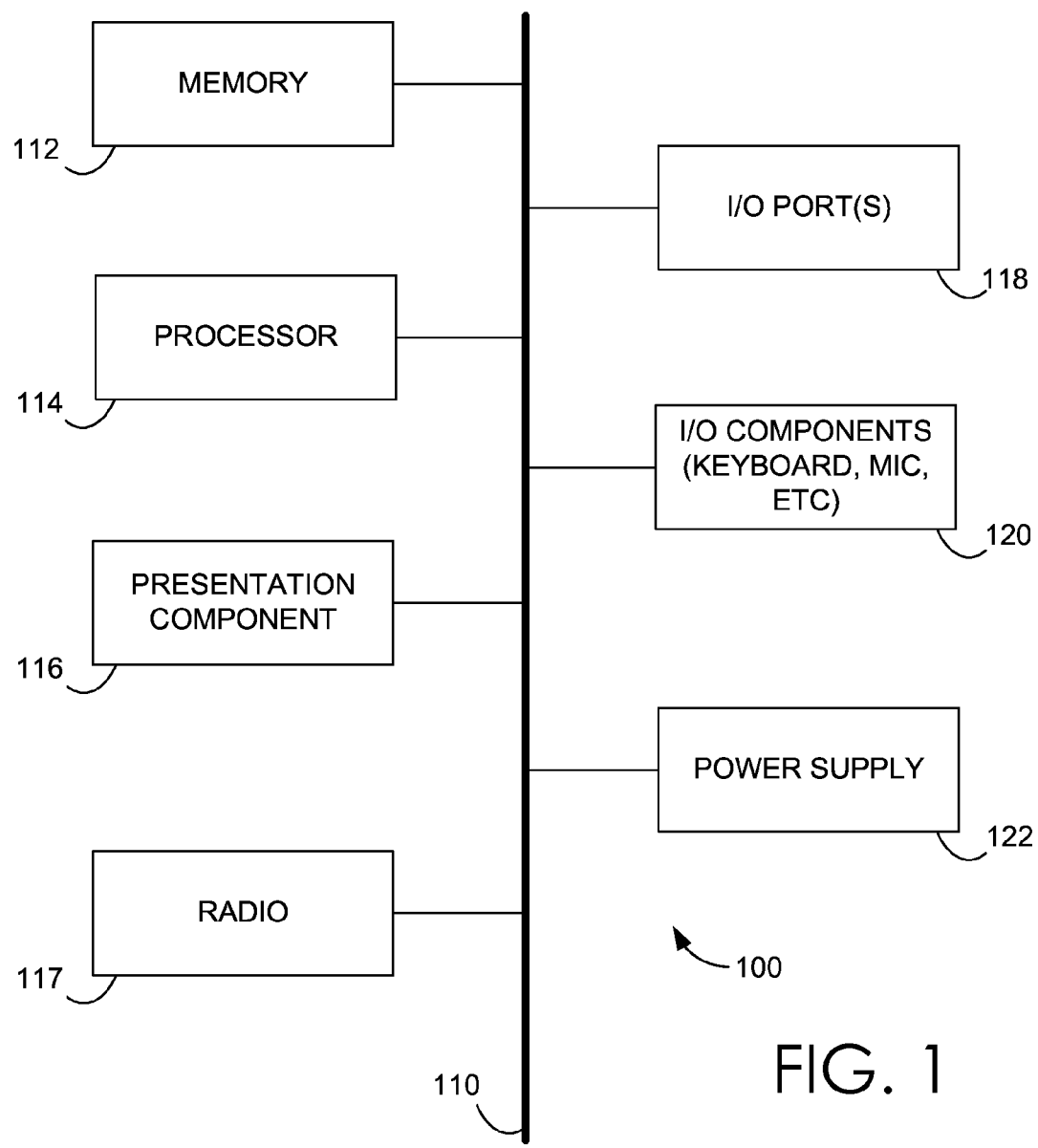
FIG. 1 depicts an exemplary computing device according to embodiments of the present disclosure.

The subject matter of select embodiments provided in the present disclosure is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
CD-ROM Compact Disk Read Only Memory
CDMA Code Division Multiple Access
eNodeB Evolved Node B
GIS Geographic/Geographical/Geospatial Information System
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MD Mobile Device
PC Personal Computer PCS Personal Communications Service
PDA Personal Digital Assistant
RAM Random Access Memory
RET Remote Electrical Tilt
RF Radio-Frequency
RNR Reverse Noise Rise
ROM Read Only Memory
RSRP Reference Signal Receive Power
RSRQ Reference Signal Receive Quality
RSSI Received Signal Strength Indicator
SINR Signal-to-Interference-Plus-Noise Ratio
SNR Signal-to-noise ratio
SON Self-Organizing Networks
TDMA Time Division Multiple Access
UMTS Universal Mobile Telecommunications Systems
VET Variable Electrical Tilt Further, various technical terms are used throughout this description. An illustrative resource that fleshes out various aspects of these terms can be found in Newton's Telecom Dictionary, 26th Edition (2011).

Embodiments of our technology may be embodied as, among other things, a device, method, system, or computer-program product. Accordingly, the embodiments may take the form of a hardware embodiment, or an embodiment combining software and hardware. One embodiment described herein takes the form of a computer-program product that includes computer-useable instructions embodied on one or more computer-readable media.

Computer-readable media includes both volatile and nonvolatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Referring to the drawings in general, and initially to FIG. 1 in particular, a block diagram of an illustrative computing device according to one embodiment is provided and referenced generally by the numeral 100. Although some components are shown in the singular, they may be plural. For example, computing device 100 might include multiple processors or multiple radios, etc. As illustratively shown, computing device 100 includes a bus 110 that directly or indirectly couples various components together including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include CDMA, GPRS, TDMA, GSM, WiMax, LTE, and the like. In some embodiments, radio 117 might also facilitate other types of wireless communications including Wi-Fi communications and GIS communications. As can be appreciated, in various embodiments, radio 117 can be configured to support multiple technologies and/or multiple radios can be utilized to support a technology or multiple technologies.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

By way of background, base stations can include one or more antenna assemblies, each having one or more antenna elements. Each antenna element can be configured to operate in a particular frequency or range of frequencies. Some of these antenna assemblies may include mechanisms for adjusting tilt of the antenna elements (i.e., to adjust beam tilt). In some configurations, these mechanisms can be powered by an electric motor, for instance, a remote electrical tilt (RET) motor. When driven by its power source, the electrical motor can, due to a non-optimal RET motor or controller design (e.g., poor grounding), inadvertently generate harmonics or "noise" that falls within one of the operating bands of the antenna assembly. In this regard, the electrical motor may generate noise that interferes with signals communicated to/from the antenna assembly. For example, assume that an antenna assembly at a base station is a multi-band antenna assembly that includes a first antenna element that operates at frequency X and a second antenna element that operates at frequency Y. Further, assume that the antenna assembly includes a RET motor coupled thereto for adjusting the antenna elements of the antenna assembly, the RET motor powered by a DC power source. In such a case, when the RET motor is activated, by supplying power thereto via the DC power source, the RET motor inadvertently generates a harmonic that falls within the X frequency, thereby interfering with the wave pattern communicated to and from the first antenna element.

Embodiments of the present disclosure facilitate mitigating signal interference in association with an antenna motor. In this regard, a base station or component thereof can be configured to detect when its signals are receiving signal interference from one or more motors associated with its antennae. Such interference can include, for example, harmonics inadvertently generated from components of the motor(s), or controller(s) therein, wherein the generated harmonics fall into one of the operating bands of the antennae, thereby causing signal interference therewith. In embodiments, detection of the signal interference occurs during a high-activity period associated with the communication tower. The detection of the signal interference can be dynamically detected and automatically mitigated. Mitigation can be performed by determining whether one of the motors is responsible for generating the signal interference and deactivating the responsible motor until reaching a time outside the high-activity period associated with the communication tower. Any adjustments to antenna elements requiring activation of the motor can be performed during a low-activity period associated with the communication tower.

Accordingly, in one aspect of the present disclosure, an embodiment is directed to a method for mitigating signal interference at a base station. The method includes ascertaining a noise baseline based on system noise associated with the base station. The base station can include a set of antenna assemblies (i.e., one or more antenna assemblies), each having one or more motors coupled thereto. The noise baseline can be ascertained while each of one or more motors is deactivated. The method also includes determining that at least one of the one or more motors coupled to the set of antenna assemblies is associated with an interference source by detecting, in the system noise associated with the base station while each of the one or more motors is activated, at least a threshold variation from the measured noise baseline. The method further includes deactivating a first motor from the one or more motors. The method also includes determining that at least the first motor from the one or more motors is associated with the interference source by detecting a substantial return to the measured noise baseline in accordance with deactivating the first motor.

In another aspect of the present disclosure, an embodiment is directed to one or more computer-readable storage media having computer-executable instructions embodied thereon that, when executed, perform a method for mitigating signal interference in an antenna assembly. The method includes determining that one or more motors coupled to a set of antenna assemblies associated with the base station is associated with an interference source by detecting, in system noise associated with the base station while each of the one or more motors is activated, at least a threshold variation from a noise baseline. The method also includes deactivating a first motor from the one or more motors coupled to the set of antenna assemblies. The method further includes determining that at least the first motor from the one or more motors is associated with the interference source by detecting a substantial return to the measured noise baseline in accordance with deactivating the first motor. The method also includes reactivating the first motor determined as being associated with the interference source after the passage of a high-activity period associated with the base station.

In yet another aspect, a system for mitigating signal interference in an antenna assembly is provided. The system includes, among other things, a RET interference mitigation service. The RET interference mitigation service can be configured for determining that at least one of one or more motors coupled to a set of antenna assemblies at a base station is associated with an interference source by detecting, in system noise associated with the base station while each of the one or more motors is activated, at least a threshold variation from a measured noise baseline. The RET interference mitigation service can also be configured for deactivating a first motors from the one or more motors, and determining that the first motor is associated with the interference source by detecting a substantial return to the measured noise baseline in accordance with deactivating the first motor.

Figure 2:
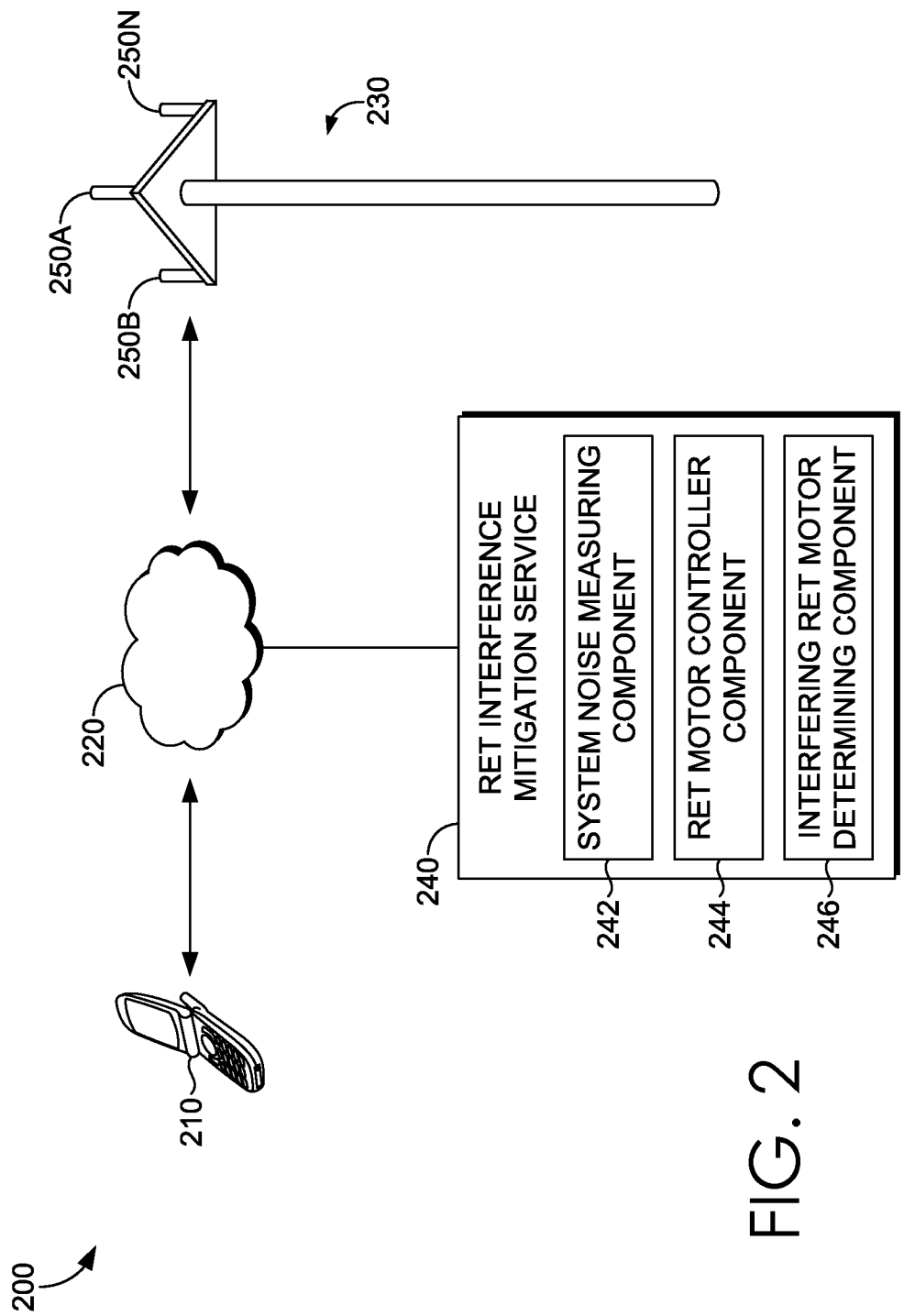
FIG. 2 is a schematic of an exemplary communications environment suitable for use in embodiments of the present disclosure.

Turning now to FIG. 2, an exemplary network environment suitable for use in implementing embodiments of the present disclosure is illustrated and designated generally as a network environment 200. Network environment 200 is but one example of a suitable network environment and is not intended to suggest any limitations as to the scope of use or functionality of embodiments described herein. Neither should the network environment be interpreted as having any dependency or requirement relating to any one or combination of components illustrated.

In the network environment 200, one or more mobile devices 210 may communicate with other devices, such as mobile devices, servers, etc. The mobile device 210 may take on a variety of forms, such as a personal computer (PC), a laptop computer, a tablet, a notebook, a mobile phone, a Smart phone, a personal digital assistant (PDA), or any other device that is capable of wirelessly communicating with the other devices using the network 200. The mobile device 210 may comprise the mobile device 100 of FIG. 1, and as such can include, for example, a display(s), a power source(s) (e.g., a battery), a data store(s), a speaker(s), memory, a buffer(s), an antenna, and the like. In embodiments, the mobile device 210 comprises a wireless or mobile device with which a wireless-telecommunication-network(s) (e.g., the network environment 200) can be utilized for communication (e.g., voice and/or data communication). In this regard, the mobile device 210 can be any mobile computing device that communicates by way of, for example, a 3G or 4G network.

The mobile device 210 can utilize a network 220 to communicate with other computing devices (e.g., a mobile device(s), a server(s), a personal computer(s), etc.) and/or with a base station such as the base station 230. In embodiments, the network 220 is a telecommunications network(s), or a portion thereof. A telecommunications network might include an array of devices or components, some of which are not shown so as to not obscure more relevant aspects of the embodiments described herein. Components such as terminals, links, and nodes (as well as other components) can provide connectivity in some embodiments. The network 220 can include multiple networks, as well as being a network of networks, but is shown in more simple form so as to not obscure other aspects of the present disclosure. The network 220 can be part of a telecommunications network that connects subscribers or users to their immediate service provider. In embodiments, the network 220 can be associated with a telecommunications provider that provides services to mobile devices, such as the mobile device 210. For example, the network 220 may provide voice and/or data services to mobile devices or corresponding users that are registered to utilize the services provided by a telecommunications provider. The network 220 can be any communication network providing voice and/or data service(s), such as, for example, a 1× circuit voice, a 3G network (e.g., CDMA, CDMA2000, WCDMA, GSM, UMTS), or a 4G network (WiMAX, LTE, HSDPA).

The network environment 200 may include a database (not shown). The database may be similar to the memory component 112A of FIG. 1 and can be any type of medium that is capable of storing information. The database can be any collection of records. In one embodiment, the database includes a set of embodied computer-executable instructions that, when executed, facilitate various aspects disclosed herein. These embodied instructions will variously be referred to as "instructions" or an "application" for short.

The network environment 200 also includes the base station 230 and a RET interference mitigation service 240. The base station 230 may, in a LTE network, also be known as a communication tower or an eNodeB. The base station 230 may be associated with the network 220 and communicate with, for instance, the mobile device 210. The communication may involve receiving RF signals from the mobile device 210 using one or more antenna assemblies, such as antenna assemblies 250a, 250b, 250n, and transmitting RF signals to the user device 210 using the one or more antenna assemblies 250a, 250b, 250n, as will be described in more detail with reference to FIG. 3. The base station 230 can be configured to transmit and receive RF signals that each correspond to one or more frequencies, depending at least on configurations of the antenna assemblies. In this regard, the base station 230 may have a number of associated RF signal frequencies being communicated to and from the base station 230. The components of network environment 200 have been illustrated separately but may, in fact, be integrated into a single component. For instance, the RET interference mitigation service 240 may be a component of the base station 230.

The RET interference mitigation service 240 includes at least a system noise measuring component 242, a RET motor controller component 244, and an interfering RET motor determining component 246. The system noise measuring component 242 is adapted to, among other things, monitor and/or measure system noise associated with base station 230 and/or its one or more antenna assemblies at any given time. More specifically, the system noise measuring component 242 may be configured to monitor and/or measure local RF signals and/or interfering RF signals within the communication range. In some aspects, the system noise measuring component 242 may be configured to detect and/or measure various forms of signal data (i.e., signal-to-noise ratios or reverse-noise-rise values) associated with the base station 230. In other aspects, the system noise measuring component 242 may be configured to receive measurements of signal data associated with the base station 230 from a signal data measuring module (not shown), and monitor and/or analyze the signal data as it is received from the signal data measuring module.

The RET motor controller component 244 of the RET interference mitigation service 240 is configured to control, among other things, the activation and deactivation of each of the RET motors (not shown) associated with each of the one or more antenna assemblies associated with the base station 230, as will be described in more detail with respect to FIG. 3. The activation and deactivation of the RET motors can be performed directly by the RET motor controller component 244, or indirectly through a motor controller module (not shown), both which can be configured to directly or indirectly supply or stop the supply of power to each of the RET motors. In some instances, the RET motors can each be powered by a standard DC power supply using, by way of example only, the AISG 2.0 standard protocol, wherein the power supply to each RET motor is dynamically controlled by way of the RET motor controller component 244 or indirectly through the motor controller module (not shown).

The interfering RET motor determining component 246 of the RET interference mitigation service 240 is configured to at least determine whether any of the one or more RET motors (not shown) associated with the one or more antenna assemblies associated with the base station 230 is responsible for interfering with the RF signals associated with the base station, as will be explained in more detail herein. The interfering RET motor determining component 246 may be configured to employ functions of the system noise measuring component 242 and/or the RET motor controller component 244. For instance, the interfering RET motor determining component 246 can be configured to employ the system noise measuring component 242 and/or the RET motor controller component 244 to ascertain a noise baseline associated with the antenna assembly. The noise baseline can be ascertained based on system noise associated with the base station while all motors at the base station are deactivated by, for instance, the RET motor controller component 244. When the system noise is measured (while all motors are deactivated), the measured system noise can be referenced as a system noise baseline to determine whether any system noise or interference detected after reactivation of one or more motors can be attributed to the one or more activated motors. The system noise baseline can be measured on a predefined interval basis (e.g., once an hour or every 5 minutes) or on a continuous basis and averaged over the measured time.

The interfering RET motor determining component 246 can further be configured to determine that at least one of the one or more motors coupled to the set of antenna assemblies is associated with an interference source. The interference source, as described herein, can be a result of a faulty controller, motor component, power supply, or other harmonic generating source, associated with at least one of the one or more motors. The interference source, in various configurations, can be deactivated by "turning off" the associated motor by cutting the power supply provided thereto, as will be described herein. To determine whether any of the one or more motors is associated with an interference source, a threshold variation from the measured noise baseline must first be detected upon reactivation of the one or more motors coupled to the set of antenna assemblies. By way of a non-limiting example only, if a noise baseline is ascertained at 0.5 dB, and the threshold variation is preset to +3 dB, a determination can be made that at least one of the motors is associated with an interfering source if, upon reactivation of the motors, the system noise is measured to exceed the +3 dB threshold, or in other words, the noise is greater than 3 dB. If, on the other hand, the system noise after reactivation of the motors does not exceed the threshold variation from the measured noise baseline, a determination can be made that none of the motors are associated with an interference source.

Once determined that at least one of the motors is associated with an interference source or, in other words, once determining that the system noise exceeds the threshold variation after activating all of the motors, the interfering RET motor determining component 246 can further determine which motor(s) is associated with the interference source. The interfering RET motor determining component 246 can be configured to test each motor, one by one, while continuing to measure the system noise associated with the base station as each motor is deactivated and reactivated. In more detail, a first motor from the one or more motors is tested by the interfering RET motor determining component 246 by first being deactivated, for instance, by way of the RET motor controller component 244. Throughout the process, the system noise is measured, for instance, by way of the system noise measuring component 242, and compared to the measured noise baseline. If, upon deactivating the first motor, a substantial return to the measured noise baseline is detected or, in other words, the system noise no longer exceeds the threshold variation, the first motor can be determined to be associated with the interference source. However, if upon deactivating the first motor, the system noise does not substantially change (i.e., the system noise continues to exceed the threshold variation), the first motor can be eliminated from consideration as being associated with the interference source. In such instances, the first motor would be reactivated and the interfering RET motor determining component 246 would proceed to test a second motor from the one or more motors. Each of the one or more motors can be tested, as described, until at least one of the motors is determined to be associated with the interference source. It is contemplated that more than one motor can be associated with an interference source. In such cases, a substantial return to the measured noise baseline would be equivalent to a 20% to 80% reduction in system noise upon deactivation of the first motor. As one of ordinary skill in the art may appreciate, if one motor is determined to be associated with an interference source, the other motors can also be subsequently tested to determine whether additional return to the measured noise baseline can be detected and attributed thereto, thereby resulting in a determination that more than one motor is associated with an interference source.

The RET interference mitigation service 240, upon determining that at least the first motor from the one or more motors is associated with the interference source, can be configured to deactivate (for instance, using RET motor controller component 244) at least the first motor so that the system noise can substantially return to the noise baseline. In other words, the RET interference mitigation service 240 is configured to disable the motors that are generating an interference (e.g., an interfering harmonic) with the operating bands of the base station 230. The RET interference mitigation service 240 can be configured to disable the one or more motors determined to be associated with the interference source for the duration of a high-activity period associated with the base station. In more detail, the base station may be associated with at least one of a high-activity period and a low-activity period. The high-activity period can correspond to a timeframe (e.g., 6:00 AM to 6:59 PM) that is associated with high levels of telecommunications traffic being transmitted to and from the base station. The low-activity period, on the other hand, can correspond to a complementary timeframe (e.g., 7:00 PM to 5:59 AM) that is associated with low levels of telecommunications traffic being transmitted to and from the base station. The high-activity and low-activity periods can be configured dynamically by the base station, or manually by an operator.

Moving now to FIGS. 3A-3B, in reference to the antenna assemblies 250a, 250b, 250n of FIG. 2, an antenna assembly 300 is illustrated. In some embodiments, the antenna assembly 300 can have, among other things, variable electrical tilt (VET) functionality, which provides network operators with the ability to tilt the elevation beam pointing direction of an antenna element(s) 310 by manually rotating a knob 320 or translating a shaft 330 on the exterior of the antenna assembly 300. Beam tilt adjustment is generally needed in cellular networks to reduce signal propagation between sites in a network in order to minimize signal interference and to maximize network capacity. The knob 320 or shaft 330, in the aforementioned configurations, can be linked to phase shifters inside the antenna assembly 300 to convert the mechanical rotation or translation of the shaft to phase changes in the radio frequency beam forming network inside the antenna assembly. Changes in phase between radiating elements inside the antenna assembly can cause the beam emitted from the antenna assembly 300 to tilt up or down relative to the mechanical boresite 340 of the antenna assembly 300.

In embodiments described herein, an electrical motor 350 or actuator can be attached to or installed inside the antenna assembly 300 for rotating the knob 320 or translating the shaft 330 of an antenna assembly that is VET-capable. These electrical motors 350, otherwise referred to herein as a remote electrical tilt (RET) motor, can be remotely controlled by a the base station or an operator, eliminating the need to manually adjust the electrical tilt of the antenna beam. The electrical motor 350 or actuator can be powered by an external power source 360, for instance, a DC power source. In some embodiments, the DC power source can include an AISG 2.0 standard power supply that provides an interface between the base station 230 and the electrical motor 350.

The base station 230 might be implemented and/or owned by a first entity (e.g., a wireless telecommunications provider). As illustrated in FIG. 2, the base station 230 can be configured to include one or more antenna assemblies 250a, 250b, 250n, as was further described in FIG. 3. The user device 210 of FIG. 2 may communicate, for example, with another mobile device, a server, or the like, using the base station 230. The user device 210 may take a variety of forms, such as a personal computer (PC), a laptop computer, a tablet, a mobile phone, a personal digital assistant (PDA), or any other user device that is capable of communicating with other devices. A device can include, for example, a display(s), a power source(s), a data store(s), a speaker(s), a memory, a buffer(s), and the like. In embodiments, a user device comprises a wireless or mobile device with which a wireless telecommunications network is utilized for communication (e.g., voice and/or data communication).

In communicating with other devices, signals are transmitted to and/or from the base station 230 associated with a network, through its one or more antenna assemblies 250a, 250b, 250n, each which may be associated with one or more operating bands/frequencies. The base station 230 refers to a tower that facilitates wireless communication between user devices. Depending on the wireless communication technologies employed by the network, a communication tower might be referred to as or include a base transceiver station (BTS), a radio base station (RBS), a base station (BS), a node B (in 3G networks), or an eNodeB (in LTE network).

The base station 230 may communicate with the user device 210 via a network(s). A network might be a single network or multiple networks, as well as being a network of networks. In embodiments, network is or includes a wireless network (e.g., a wireless telecommunications network). A wireless telecommunications network refers to any type of telecommunications network that is wireless. Examples of wireless telecommunications technologies include, but are not limited to, Global System for Mobile Communications (GSM), General Packet Radio Service (GPRS), Code Division Multiple Access (CDMA), CDMA2000, CDMAOne, Time Division Multiple Access (TDMA), Long Term Evolution (LTE), Universal Mobile Telecommunications Systems (UMTS), Integrated Digital Enhanced Network (iDEN), WiMAX, 3G, 4G, and Personal Communications Service (PCS). In one embodiment, the network is or includes a LTE network. A wireless telecommunications network might include an array of devices.

Although network environment 200 is illustrated with single components, as can be appreciated, the components are scalable and any number of each of the components may exist in the network environment. Further, although not illustrated herein, additional components or combination of components may exist within the network environment 200. While FIG. 2 is generally described in relation to RET motors, as can be appreciated, any other base station-controlled or operated component(s) are also contemplated in accordance with embodiments described herein. Further, although generally discussing RET motor interference, other electrically powered devices could be regulated using the herein described techniques to avoid interference caused by inadvertently-generated harmonics.

Turning now to FIGS. 4 and 5, methods for mitigating signal interference at a base station are provided. In particular, FIGS. 4 and 5 show flow diagrams illustrating methods to mitigate signal interference at a base station, in accordance with embodiments of the present disclosure. It will be understood by those of ordinary skill in the art that the order of steps shown in the method 400 of FIG. 4, method 500 of FIG. 5 are not meant to limit the scope of the present disclosures in any way and, in fact, the steps may occur in a variety of different sequences within embodiments hereof. Any and all such variations, and any combination thereof, are contemplated to be within the scope of embodiments described herein.

With initial reference to FIG. 4, in embodiments, method 400 can be performed at a base station, such as base station 230 of FIG. 2. More specifically, method 400 might be performed by a RET interference mitigation service 240 of FIG. 2. Initially, as indicated at block 410, a noise baseline based on system noise associated with the base station is ascertained. The base station can include a set of antenna assemblies having one or more motors coupled thereto. The noise baseline is ascertained while the one or more motors are deactivated (i.e., the power supplied thereto is terminated). At block 420, at least one of the one or more motors coupled to the set of antenna assemblies is determined to be associated with an interference source. This determination can be made by detecting, while the one or more motors are activated (i.e., power is supplied thereto) at least a threshold variation in the system noise from the measured baseline. At block 430, a first motor from the one or more motors is deactivated. The first motor can be deactivated, for instance, by terminating the power supplied thereto, switching the motor into an off-state, or sending a single to the motor to turn the motor into an off-state. At block 440, at least the first motor can be determined to be associated with the interference source by detecting, upon deactivating the first motor, a substantial return to the measured noise baseline.

Turning now to FIG. 5, in embodiments, method 500 can be performed at a base station, such as base station 230 of FIG. 2. Initially, as indicated at block 510, at least one or more motors coupled to a set of antenna assemblies associated with a base station can be determined as being associated with an interference source. The determination can be made by detecting, in system noise associated with the base station while each of the one or more motors is activated, at least a threshold variation from a noise baseline. At block 520, a first motor from the one or more motors is deactivated. At block 530, at least the first motor can be determined to be associated with the interference source by detecting a substantial return to the noise baseline in accordance with deactivating the first motor. At block 540, the first motor determined to be associated with the interference source can be reactivated after the passage of a high-activity period associated with the base station.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for mitigating signal interference at a base station, the method comprising:
ascertaining a noise baseline based on system noise associated with the base station, the base station including a set of antenna assemblies having one or more motors coupled thereto, wherein the noise baseline is ascertained while the one or more motors are deactivated;
determining that at least one of the one or more motors coupled to the set of antenna assemblies is associated with an interference source by detecting, in the system noise associated with the base station while the one or more motors are activated, at least a threshold variation from the measured noise baseline;
deactivating a first motor from the one or more motors; and
determining that at least the first motor from the one or more motors is associated with the interference source by detecting a substantial return to the measured noise baseline in accordance with deactivating the first motor.

2. The method of claim 1, wherein each of the one or more motors is a remote electrical tilt (RET) motor.

3. The method of claim 1, wherein deactivating the first motor includes disabling an electrical power supply coupled thereto.

4. The method of claim 3, wherein the electrical power supply is a DC power source.

5. The method of claim 1, wherein ascertaining the noise baseline includes at least measuring the system noise on one of a predefined interval basis or a continuous basis.

6. The method of claim 5, wherein ascertaining the noise baseline further includes averaging the measured system noise.

7. The method of claim 1, wherein the system noise is a Reverse Noise Rise (RNR) value.

8. The method of claim 1, wherein the ascertaining, determining, deactivating, and determining steps are each performed by the base station.

9. The method of claim 8, wherein the base station is an Evolved Node B (eNodeB).

10. One or more computer-readable storage devices having computer-executable instructions embodied thereon that, when executed, perform a method for mitigating signal interference associated with a base station, the method comprising:
determining that at least one or more motors coupled a set of antenna assemblies associated with the base station is associated with an interference source by detecting, in system noise associated with the base station while each of the one or more motors is activated, at least a threshold variation from a noise baseline;

deactivating a first motor from the one or more motors coupled to the set of antenna assemblies;

determining that at least the first motor from the one or more motors is associated with the interference source by detecting a substantial return to the noise baseline in accordance with deactivating the first motor;

reactivating the first motor determined to be associated with the interference source after the passage of a high-activity period associated with the base station.

11. The one or more computer-readable storage devices of claim 10, wherein the noise baseline is based on system noise associated with the base station while each of the one or more motors coupled thereto is deactivated.

12. The one or more computer-readable storage devices of claim 10, wherein each of the one or more motors is a remote electrical tilt (RET) motor.

13. The one or more computer-readable storage devices of claim 10, wherein deactivating the first motor includes disabling an electrical power supply coupled thereto.

14. The one or more computer-readable storage devices of claim 13, wherein the electrical power supply is a DC power source.

15. The one or more computer-readable storage devices of claim 10, wherein the system noise is a Reverse Noise Rise (RNR) value.

16. The one or more computer-readable storage devices of claim 10, wherein the determining, deactivating, determining, and reactivating steps are each performed by the base station.

17. The one or more computer-readable storage devices of claim 10, wherein reactivating is conducted during a low-activity period associated with the base station to adjust one or more antenna elements in the set of antenna assemblies, wherein the low-activity period is a scheduled time for conducting standard maintenance on the base station.

18. A system for mitigating signal interference associated with a base station, the system comprising:

a RET interference mitigation service configured to:

determine that at least one of one or more motors coupled to a set of antenna assemblies at the base station is associated with an interference source by detecting, in system noise associated with the base station while each of the one or more motors is activated, at least a threshold variation from a measured noise baseline;

deactivate a first motor from the one or more motors; and determine that the first motor from the one or more motors is associated with the interference source by detecting a substantial return to the measured noise baseline in accordance with deactivating the first motor.

19. The system of claim 18, the RET interference mitigation service further configured to:

keep the first motor deactivated for a high-activity period associated with the base station; and reactivate the first motor during a low-activity period associated with the base station.

20. The system of claim 18, wherein to deactivate the first motor includes disabling an electrical connection coupled thereto.

* * * * *